(12) United States Patent
Kanemoto

(10) Patent No.: US 9,470,525 B2
(45) Date of Patent: Oct. 18, 2016

(54) GYRO SENSOR AND ELECTRONIC APPARATUS

(71) Applicant: Seiko Epson Corporation, Tokyo (JP)

(72) Inventor: Kei Kanemoto, Suwa (JP)

(73) Assignee: Seiko Epson Corporation (JP)

( * ) Notice: Subject to any disclaimer, the term of this patent is extended or adjusted under 35 U.S.C. 154(b) by 462 days.

(21) Appl. No.: 13/863,666

(22) Filed: Apr. 16, 2013

(65) Prior Publication Data

US 2013/0276536 A1 Oct. 24, 2013

(30) Foreign Application Priority Data

Apr. 19, 2012 (JP) .................................. 2012-095481

(51) Int. Cl.
G01C 19/56 (2012.01)
G01C 19/5762 (2012.01)

(52) U.S. Cl.
CPC ............ *G01C 19/56* (2013.01); *G01C 19/5762* (2013.01)

(58) Field of Classification Search
CPC .................................................. G01C 19/5762
USPC ........................................................ 73/504.12
See application file for complete search history.

(56) References Cited

U.S. PATENT DOCUMENTS

| 5,834,332 | A | * | 11/1998 | Hierold | ............... | B81C 1/00246 |
| | | | | | | 438/48 |
| 6,065,341 | A | * | 5/2000 | Ishio | ..................... | B81B 3/0051 |
| | | | | | | 73/514.38 |
| 6,125,700 | A | | 10/2000 | Tsugai et al. | | |
| 8,104,344 | B2 | | 1/2012 | Fujiyoshi et al. | | |
| 2009/0071247 | A1 | | 3/2009 | Konaka | | |
| 2009/0100930 | A1 | | 4/2009 | Coronato et al. | | |
| 2010/0192690 | A1 | | 8/2010 | Classen et al. | | |
| 2010/0219716 | A1 | | 9/2010 | Akashi et al. | | |
| 2012/0006115 | A1 | * | 1/2012 | Classen | .............. | G01C 19/5747 |
| | | | | | | 73/504.13 |
| 2012/0160027 | A1 | * | 6/2012 | Hsu | ....................... | B81B 3/0086 |
| | | | | | | 73/504.08 |

FOREIGN PATENT DOCUMENTS

| JP | 11-002526 A | 1/1999 |
| JP | 11-304834 | 11/1999 |
| JP | 2001-194153 A | 7/2001 |
| JP | 2009-150815 | 7/2009 |
| JP | 2010-117293 | 5/2010 |
| JP | 2010-205766 A | 9/2010 |
| JP | 2010-216842 | 9/2010 |
| WO | WO-2009-037751 A1 | 3/2009 |

* cited by examiner

*Primary Examiner* — John Chapman, Jr.
(74) *Attorney, Agent, or Firm* — Harness, Dickey & Pierce, P.L.C.

(57) ABSTRACT

A gyro sensor includes: a base body; a vibrating body; a driving portion driving the vibrating body in a direction of a first axis; a movable electrode portion displaceable, according to angular velocity about a second axis perpendicular to the first axis, in a direction of a third axis perpendicular to the first axis and the second axis; a first spring portion connected to the vibrating body and a first side surface of the movable electrode portion, the first side surface intersecting the first axis or the second axis; a second spring portion connected to the vibrating body and a second side surface of the movable electrode portion, the second side surface being parallel to the first side surface. The first spring portion and the second spring portion have portions extending in the direction of the first axis and portions extending in a direction of the second axis.

16 Claims, 10 Drawing Sheets

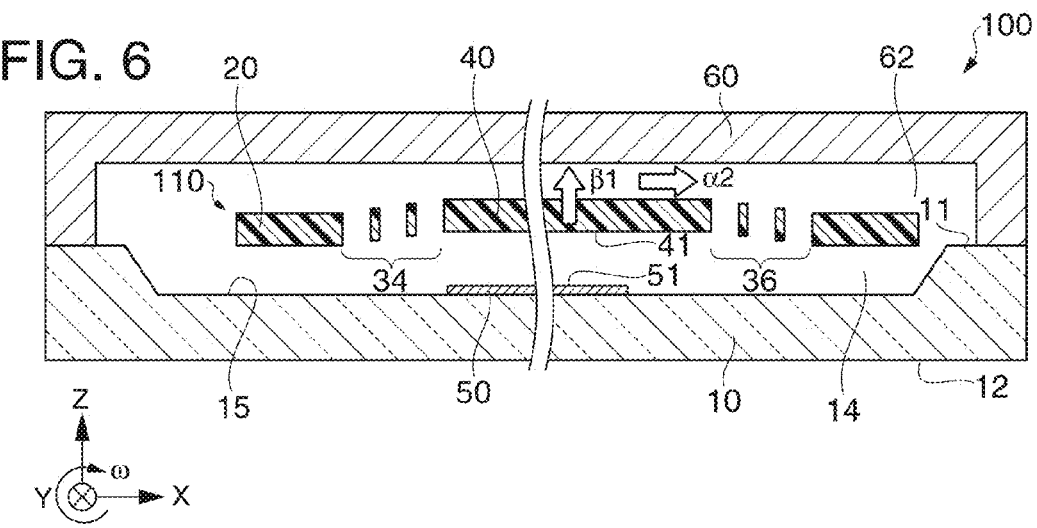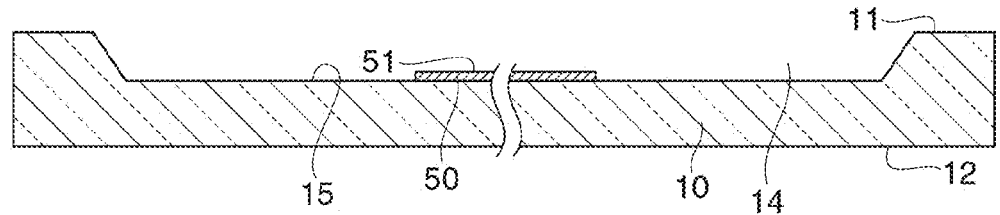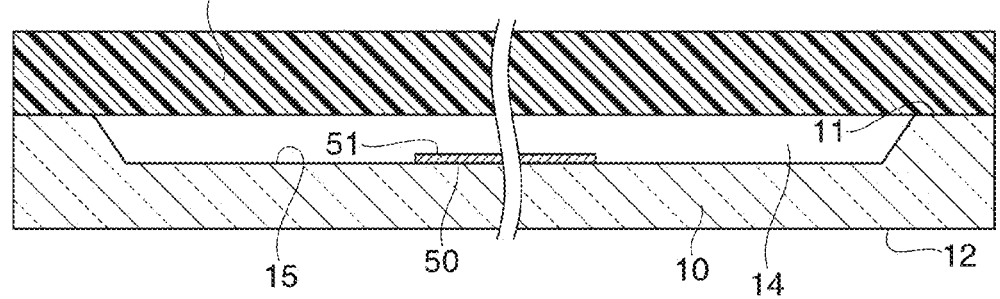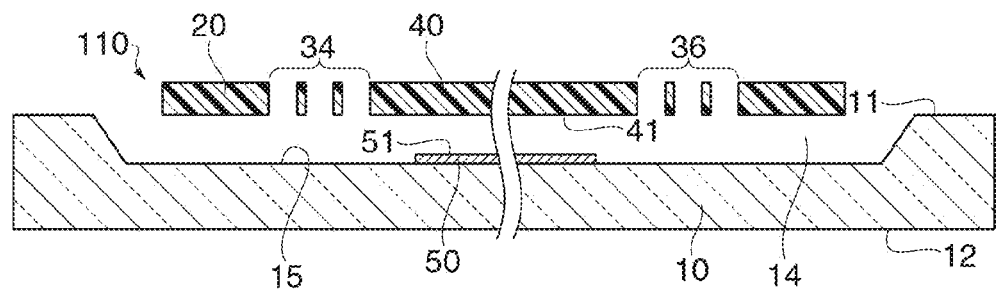

GYRO SENSOR AND ELECTRONIC APPARATUS

BACKGROUND

1. Technical Field

The present invention relates to a gyro sensor and an electronic apparatus.

2. Related Art

In recent years, angular velocity sensors (gyro sensors) that detect angular velocity have been developed using, for example, a silicon MEMS (Micro Electro Mechanical Systems) technique.

For example, U.S. Patent Application Publication No. 2009/0100930 discloses a gyro sensor including a sensor mass connected to a driving mass via a torsion spring and a detecting electrode arranged spaced apart from the sensor mass. The sensor mass can perform rotary motion about an axis of rotation defined by the torsion spring. The gyro sensor can detect angular velocity based on a change in capacitance between the sensor mass and the detecting electrode.

In the gyro sensor, however, the size of a gap between the sensor mass and the detecting electrode is hardly changed in the vicinity of the axis of rotation, so that detection sensitivity is low.

SUMMARY

An advantage of some aspects of the invention is to provide a gyro sensor that can have high detection sensitivity. Moreover, another advantage of some aspects of the invention is to provide an electronic apparatus having the gyro sensor.

The invention can be implemented as the following modes or application examples.

APPLICATION EXAMPLE 1

A gyro sensor according to this application example includes: a base body; a vibrating body; a driving portion driving the vibrating body in a direction of a first axis; a movable electrode portion displaceable, according to angular velocity about a second axis perpendicular to the first axis, in a direction of a third axis perpendicular to the first axis and the second axis; a first spring portion connected to the vibrating body and a first surface of the movable electrode portion, the first surface intersecting the first axis or the second axis; a second spring portion connected to the vibrating body and a second surface of the movable electrode portion, the second surface being parallel to the first surface; and a fixed electrode portion arranged on the base body and facing the movable electrode portion in the direction of the third axis, wherein each of the first spring portion and the second spring portion has a portion extending in the direction of the first axis and a portion extending in a direction of the second axis.

According to the gyro sensor, the movable electrode portion can be displaced in the direction of the third axis according to angular velocity about the second axis while, for example, a lower surface of the movable electrode portion keeps parallel to an upper surface of the fixed electrode portion. With this configuration, in the gyro sensor, a change in electrostatic capacitance between the movable electrode portion and the fixed electrode portion can be made large, compared to the case where the movable electrode portion performs rotary motion, so that high detection sensitivity can be provided.

APPLICATION EXAMPLE 2

In the gyro sensor according to the application example, the gyro sensor may further include: a third spring portion connected to the vibrating body and a third surface of the movable electrode portion, the third surface intersecting the first axis; and a fourth spring portion connected to the vibrating body and a fourth surface of the movable electrode portion, the fourth surface being parallel to the third surface, wherein the first surface may intersect the second axis, and each of the third spring portion and the fourth spring portion may have a portion extending in the direction of the first axis and a portion extending in the direction of the second axis.

In the gyro sensor with this configuration, it is possible to suppress the displacement of the movable electrode portion in the direction of the second axis relative to the vibrating body. With this configuration, it is possible to suppress a change in the area of the movable electrode portion overlapping with the fixed electrode portion as viewed from the direction of the third axis, so that high detection sensitivity can be provided.

APPLICATION EXAMPLE 3

In the gyro sensor according to the application example, the first spring portion may be connected to a first corner portion formed by the first surface and the third surface, the second spring portion may be connected to a second corner portion formed by the second surface and the fourth surface, the third spring portion may be connected to a third corner portion formed by the second surface and the third surface, and the fourth spring portion may be connected to a fourth corner portion formed by the first surface and the fourth surface.

According to the gyro sensor with this configuration, the movable electrode portion can be displaced stably in the direction of the third axis according to angular velocity about the second axis.

APPLICATION EXAMPLE 4

In the gyro sensor according to the application example, the first surface may intersect the second axis, the first spring portion may be connected to a first corner portion formed by the first surface and a third surface of the movable electrode portion, the third surface intersecting the first axis, the second spring portion may be connected to a second corner portion formed by the second surface and a fourth surface of the movable electrode portion, the fourth surface being parallel to the third surface, the first spring portion may be disposed along the first corner portion as viewed from the direction of the third axis, and the second spring portion may be disposed along the second corner portion as viewed from the direction of the third axis.

According to the gyro sensor with this configuration, high detection sensitivity can be provided.

APPLICATION EXAMPLE 5

In the gyro sensor according to the application example, the gyro sensor may further include: a third spring portion connected to the vibrating body and the second surface; and a fourth spring portion connected to the vibrating body and the first surface, wherein the first surface may intersect the second axis, the size of the movable electrode portion in the direction of the first axis may be greater than that of the movable electrode portion in the direction of the second axis, and each of the third spring portion and the fourth spring portion may have a portion extending in the direction of the first axis and a portion extending in the direction of the second axis.

According to the gyro sensor with this configuration, high detection sensitivity can be provided.

APPLICATION EXAMPLE 6

In the gyro sensor according to the application example, the gyro sensor may further include a first stopper portion arranged between the vibrating body and the movable electrode portion in the direction of the first axis.

According to the gyro sensor with this configuration, it is possible to suppress the displacement of the movable electrode portion in the direction of the first axis relative to the vibrating body.

APPLICATION EXAMPLE 7

In the gyro sensor according to the application example, the gyro sensor may further include a second stopper portion arranged between the base body and the movable electrode portion in the direction of the third axis.

According to the gyro sensor with this configuration, it is possible to suppress the adhesion of the movable electrode portion to, for example, the fixed electrode portion due to the movable electrode portion being pulled toward the base body side.

APPLICATION EXAMPLE 8

An electronic apparatus according to this application example includes the gyro sensor according to the application example.

According to the electronic apparatus, since the gyro sensor according to the application example is included, high detection sensitivity can be provided.

BRIEF DESCRIPTION OF THE DRAWINGS

The invention will be described with reference to the accompanying drawings, wherein like numbers reference like elements.

FIG. 6 is a cross-sectional view schematically showing operation of the gyro sensor according to the embodiment.

FIG. 7 is a cross-sectional view schematically showing a manufacturing step of the gyro sensor according to the embodiment.

FIG. 8 is a cross-sectional view schematically showing a manufacturing step of the gyro sensor according to the embodiment.

FIG. 9 is a cross-sectional view schematically showing a manufacturing step of the gyro sensor according to the embodiment.

DESCRIPTION OF EXEMPLARY EMBODIMENTS

Hereinafter, a preferred embodiment of the invention will be described in detail using the drawings. The embodiment described below does not unduly limit the contents of the invention set forth in the appended claims. Moreover, not all of configurations described below are indispensable constituent features of the invention.

1. Gyro Sensor

Figure 1:
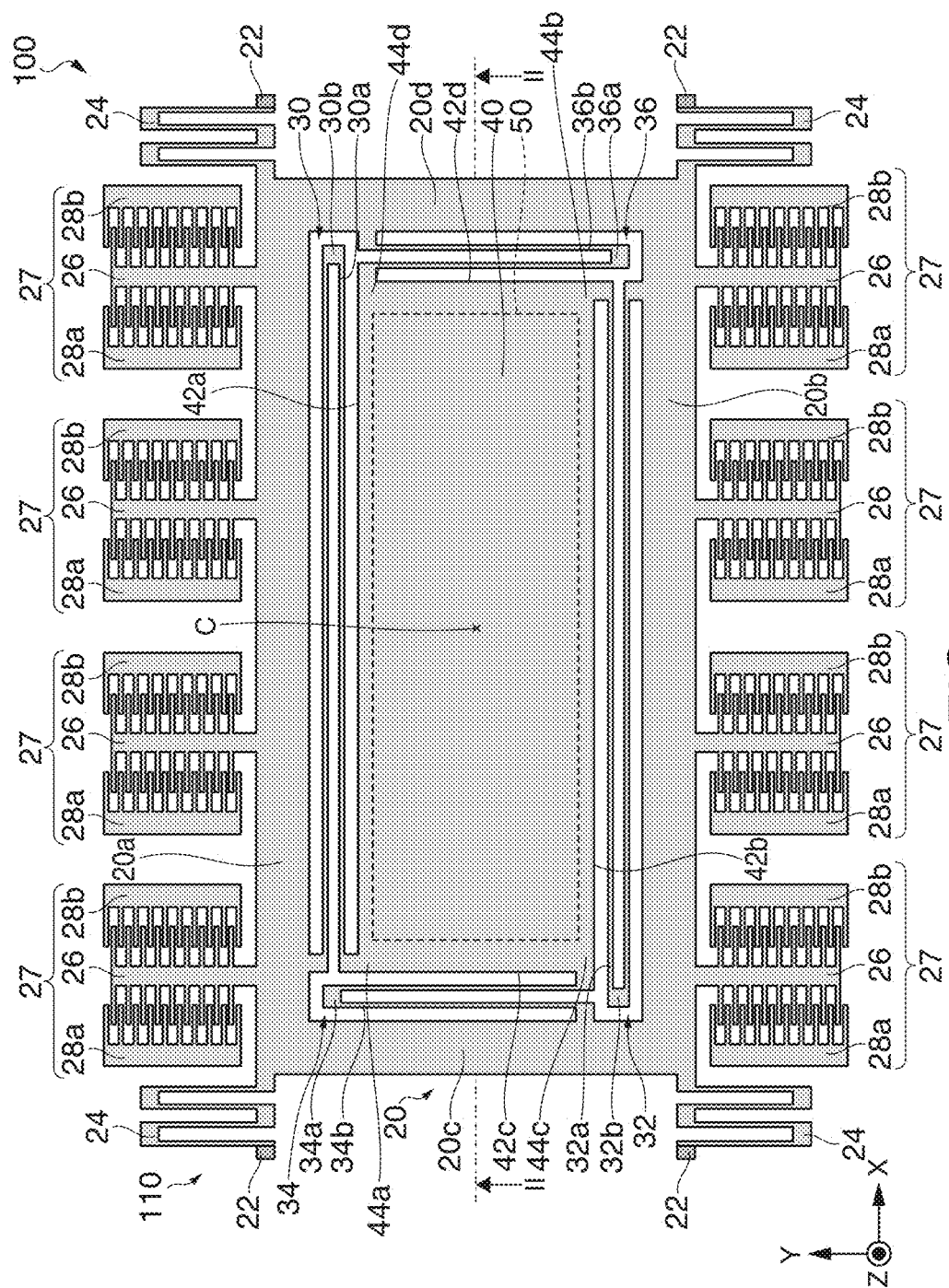
FIG. 1 is a plan view schematically showing a gyro sensor according to an embodiment.
Figure 2:
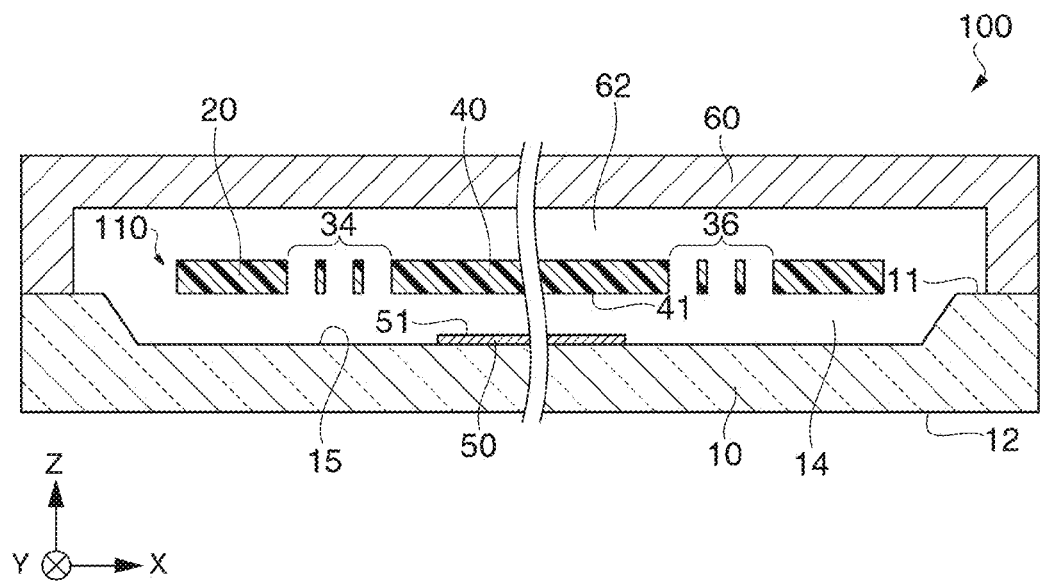
FIG. 2 is a cross-sectional view schematically showing the gyro sensor according to the embodiment.
Figure 3:
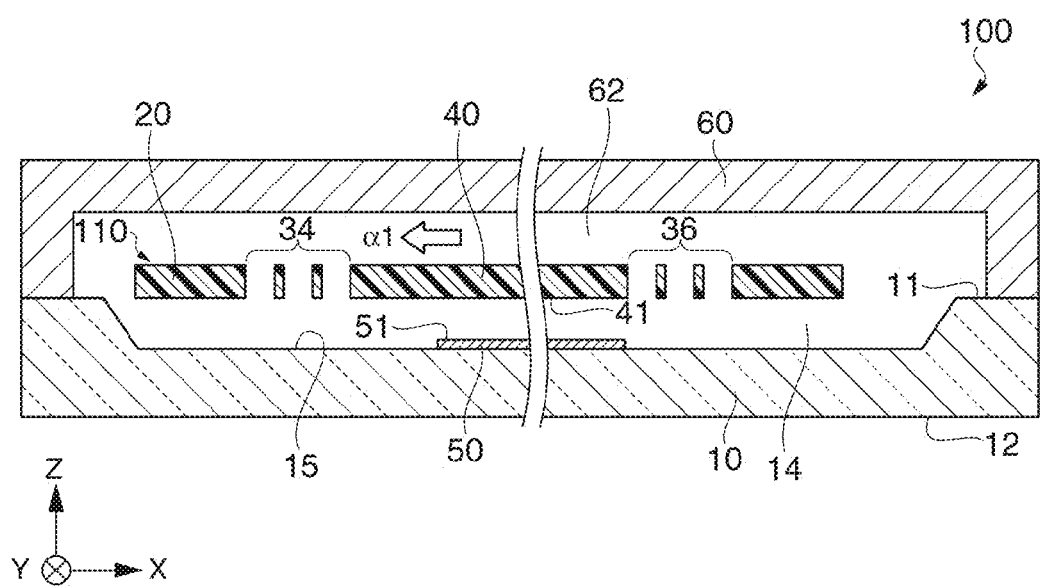
FIG. 3 is a cross-sectional view schematically showing operation of the gyro sensor according to the embodiment.
Figure 4:
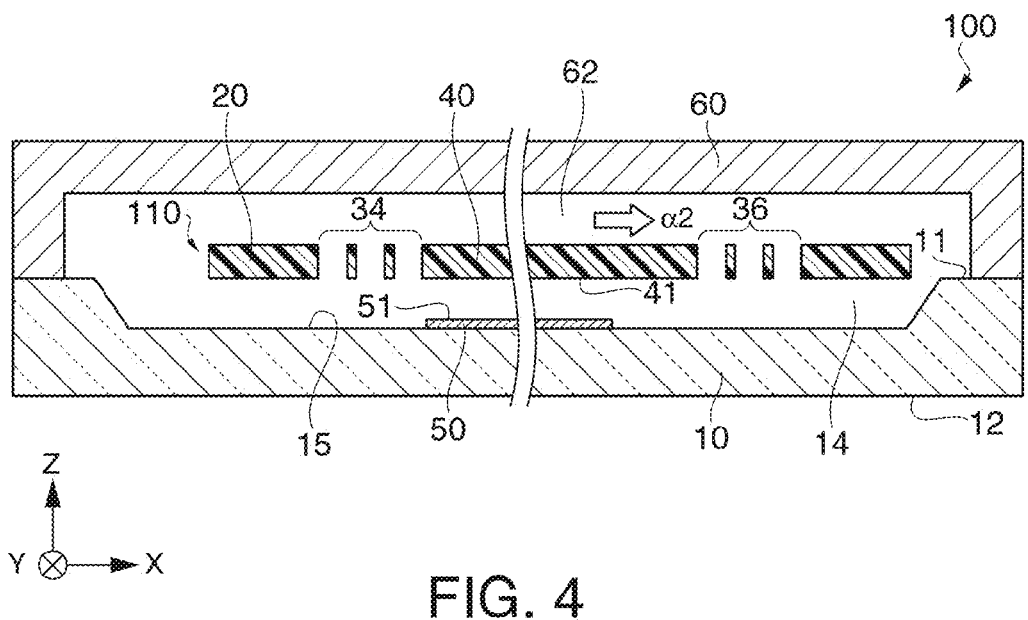
FIG. 4 is a cross-sectional view schematically showing operation of the gyro sensor according to the embodiment.
Figure 5:
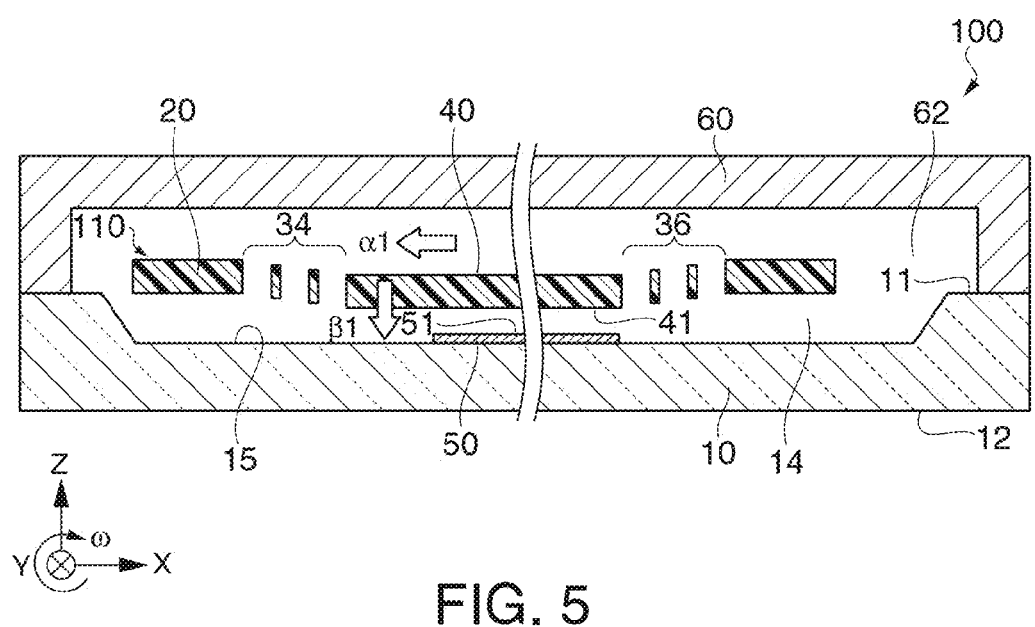
FIG. 5 is a cross-sectional view schematically showing operation of the gyro sensor according to the embodiment.

First, a gyro sensor according to the embodiment will be described with reference to the drawings. FIG. 1 is a plan view schematically showing the gyro sensor 100 according to the embodiment. FIG. 2 is a cross-sectional view schematically showing the gyro sensor 100 according to the embodiment, taken along line II-II of FIG. 1. For convenience sake, the illustration of a base body 10 and a lid 60 is omitted in FIG. 1. Moreover, in FIGS. 1 and 2, an X-axis, a Y-axis, and a Z-axis are illustrated as three axes perpendicular to each other. Moreover, in the embodiment and modified examples shown below, an axis parallel to the X-axis is defined as a first axis, an axis parallel to the Y-axis is defined as a second axis, and an axis parallel to the Z-axis is defined as a third axis. Moreover, in the embodiment and modified examples shown below, a direction parallel to the X-axis (a direction of the first axis) is referred to as an X-axis direction, a direction parallel to the Y-axis (a direction of the second axis) is referred to as a Y-axis direction, and a direction parallel to the Z-axis (a direction of the third axis) is referred to as a Z-axis direction.

As shown in FIGS. 1 and 2, the gyro sensor 100 can include the base body 10, the lid 60, and a functional element 110. The functional element 110 is configured to include, for example, a vibrating body 20, fixed portions 22, driving spring portions 24, driving portions 27, a first detecting spring portion 30, a second detecting spring portion 32, a third detecting spring portion 34, a fourth detecting spring portion 36, a movable detecting electrode portion (movable electrode portion) 40, and a fixed detecting electrode portion (fixed electrode portion) 50.

The material of the base body 10 is, for example, glass or silicon. As shown in FIG. 2, a recess 14 is disposed in an upper surface 11 of the base body 10. The planar shape of the recess 14 is not particularly limited. For example, the vibrating body 20, the fixed portions 22, the driving spring portions 24, movable driving electrode portions of the driving portions 27, the detecting spring portions 30, 32, 34, and 36, and the movable detecting electrode portion 40 are disposed above the recess 14 and spaced apart from the base body 10.

The fixed portions 22 are fixed (bonded) on the base body 10 (on a positive Z-axis direction side of the base body 10). The fixed portions 22 may be fixed to the upper surface 11 of the base body 10. The fixed portions 22 support the vibrating body 20 via the driving spring portions 24. In the example shown in FIG. 1, four fixed portions 22 are disposed.

The driving spring portion 24 is connected to the fixed portion 22 and the vibrating body 20. The driving spring portion 24 is displaceable along the X-axis and configured to be able to displace the vibrating body 20 in the X-axis direction. More specifically, the driving spring portion 24 extends in the X-axis direction while reciprocating in the Y-axis direction. In the example shown in FIG. 1, four driving spring portions 24 are disposed. However, the number of the driving spring portions 24 is not particularly limited as long as the driving spring portion 24 can displace the vibrating body 20 in the X-axis direction.

The vibrating body 20 can vibrate in the X-axis direction (along the X-axis). In the example shown in FIG. 1, the planar shape of the vibrating body 20 is frame-like. More specifically, the vibrating body 20 is composed of a first extending portion 20a and a second extending portion 20b that extend in the X-axis direction and a third extending portion 20c and a fourth extending portion 20d that extend in the Y-axis direction. The first extending portion 20a is located on a positive Y-axis direction side of the second extending portion 20b. The third extending portion 20c is located on a negative X-axis direction side of the fourth extending portion 20d.

The driving portions 27 can drive (vibrate) the vibrating body 20 in the X-axis direction. In the example shown in FIG. 1, eight driving portions 27 are disposed. However, the number of the driving portions 27 is not particularly limited as long as the driving portion 27 can vibrate the vibrating body 20 in the X-axis direction. The driving portion 27 is configured to include a movable driving electrode portion 26 and fixed driving electrode portions 28a and 28b.

The movable driving electrode portions 26 are connected to the vibrating body 20. In the example shown in FIG. 1, the movable driving electrode portions 26 extend from the first extending portion 20a of the vibrating body 20 in the positive Y-axis direction. Moreover, the movable driving electrode portions 26 extend from the second extending portion 20b of the vibrating body 20 in a negative Y-axis direction. As shown in FIG. 1, the movable driving electrode portion 26 may be a comb teeth-like electrode having a trunk portion extending from the vibrating body 20 in the positive Y-axis direction (or the negative Y-axis direction) and a plurality of branch portions extending from the trunk portion in a positive X-axis direction and the negative X-axis direction.

The fixed driving electrode portions 28a and 28b are fixed (bonded) on the base body 10. The fixed driving electrode portions 28a and 28b may be fixed to the upper surface 11 of the base body 10. The fixed driving electrode portions 28a and 28b face the movable driving electrode portion 26 with gaps. In the example shown in FIG. 1, the fixed driving electrode portion 28a is disposed on the negative X-axis direction side of the movable driving electrode portion 26, while the fixed driving electrode portion 28b is disposed on the positive X-axis direction side of the movable driving electrode portion 26. As shown in FIG. 1, when the movable driving electrode portion 26 has a comb teeth-like shape, the shape of the fixed driving electrode portions 28a and 28b may be a comb teeth-like electrode corresponding to the movable driving electrode portion 26.

The movable driving electrode portions 26 and the fixed driving electrode portions 28a and 28b are electrically connected to a power supply (not shown). When a voltage is applied to the movable driving electrode portion 26 and the fixed driving electrode portions 28a and 28b, an electrostatic force can be generated between the movable driving electrode portion 26 and the fixed driving electrode portions 28a and 28b. With this configuration, the driving spring portions 24 can be expanded and contracted along the X-axis, so that the vibrating body 20 can be vibrated along the X-axis.

The movable detecting electrode portion 40 is disposed inside the vibrating body 20 and spaced apart from the vibrating body 20. In the example shown in FIG. 1, the planar shape of the movable detecting electrode portion 40 is an oblong having long sides along the X-axis. The size of the movable detecting electrode portion 40 in the X-axis direction is greater than that of the movable detecting electrode portion 40 in the Y-axis direction.

The movable detecting electrode portion 40 can have a first side surface 42a, a second side surface 42b, a third side surface 42c, and a fourth side surface 42d. In the example shown in FIG. 1, the first side surface 42a is a surface intersecting (perpendicular to) the second axis. More specifically, the first side surface 42a is a surface facing in the positive Y-axis direction. The second side surface 42b is a surface intersecting (perpendicular to) the second axis and located on the side opposite to the first side surface 42a. The second side surface 42b is parallel to the first side surface 42a. More specifically, the second side surface 42b is a surface facing in the negative Y-axis direction. The third side surface 42c is a surface intersecting (perpendicular to) the first axis. More specifically, the third side surface 42c is a surface facing in the negative X-axis direction. The fourth side surface 42d is a surface intersecting (perpendicular to) the first axis and located on the side opposite to the third side surface 42c. The fourth side surface 42d is parallel to the third side surface 42c. More specifically, the fourth side surface 42d is a surface facing in the positive X-axis direction.

In the example shown in FIG. 1, in plan view (as viewed from the Z-axis direction), the first side surface 42a and the second side surface 42b are surfaces forming long sides of the movable detecting electrode portion 40 having an oblong planar shape, while the third side surface 42c and the fourth side surface 42d are surfaces forming short sides of the movable detecting electrode portion 40 having an oblong planar shape.

The movable detecting electrode portion 40 can have a first corner portion 44a, a second corner portion 44b, a third corner portion 44c, and a fourth corner portion 44d. The first corner portion 44a is a corner portion formed by the first side surface 42a and the third side surface 42c. The second corner portion 44b is a corner portion formed by the second side surface 42b and the fourth side surface 42d. The third corner portion 44c is a corner portion formed by the second side surface 42b and the third side surface 42c. The fourth corner portion 44d is a corner portion formed by the first side surface 42a and the fourth side surface 42d.

The movable detecting electrode portion 40 can vibrate along the X-axis with the vibration of the vibrating body 20. The movable detecting electrode portion 40 can be displaced in the Z-axis direction according to angular velocity about the second axis (angular velocity about the Y-axis).

The first detecting spring portion 30 is connected to the first extending portion 20a of the vibrating body 20 and the first side surface 42a of the movable detecting electrode portion 40. In the example shown in FIG. 1, the first detecting spring portion 30 is connected to the first corner portion 44a of the movable detecting electrode portion 40. More specifically, the first detecting spring portion 30 is connected to an end of the first side surface 42a on the third side surface 42c side. The first detecting spring portion 30 has first portions 30a extending in the X-axis direction and second portions 30b extending in the Y-axis direction. In the illustrated example, the first detecting spring portion 30 is composed of two first portions 30a and three second portions 30b, and extends in the Y-axis direction while reciprocating in the X-axis direction. The size of the first portion 30a in the X-axis direction is greater than that of the movable detecting electrode portion 40 in the X-axis direction.

The second detecting spring portion 32 is connected to the second extending portion 20b of the vibrating body 20 and the second side surface 42b of the movable detecting electrode portion 40. In the example shown in FIG. 1, the second detecting spring portion 32 is connected to the second corner portion 44b of the movable detecting electrode portion 40. More specifically, the second detecting spring portion 32 is connected to an end of the second side surface 42b on the fourth side surface 42d side. The second detecting spring portion 32 has first portions 32a extending in the X-axis direction and second portions 32b extending in the Y-axis direction. In the illustrated example, the second detecting spring portion 32 is composed of two first portions 32a and three second portions 32b, and extends in the Y-axis direction while reciprocating in the X-axis direction. The size of the first portion 32a in the X-axis direction is greater than that of the movable detecting electrode portion 40 in the X-axis direction.

The third detecting spring portion 34 is connected to the third extending portion 20c of the vibrating body 20 and the third side surface 42c of the movable detecting electrode portion 40. In the example shown in FIG. 1, the third detecting spring portion 34 is connected to the third corner portion 44c of the movable detecting electrode portion 40. More specifically, the third detecting spring portion 34 is connected to an end of the third side surface 42c on the second side surface 42b side. The third detecting spring portion 34 has first portions 34a extending in the X-axis direction and second portions 34b extending in the Y-axis direction. In the illustrated example, the third detecting spring portion 34 is composed of three first portions 34a and two second portions 34b, and extends in the X-axis direction while reciprocating in the Y-axis direction. The size of the second portion 34b in the Y-axis direction is greater than that of the movable detecting electrode portion 40 in the Y-axis direction.

The fourth detecting spring portion 36 is connected to the fourth extending portion 20d of the vibrating body 20 and the fourth side surface 42d of the movable detecting electrode portion 40. In the example shown in FIG. 1, the fourth detecting spring portion 36 is connected to the fourth corner portion 44d of the movable detecting electrode portion 40. More specifically, the fourth detecting spring portion 36 is connected to an end of the fourth side surface 42d on the first side surface 42a side. The fourth detecting spring portion 36 has first portions 36a extending in the X-axis direction and second portions 36b extending in the Y-axis direction. In the illustrated example, the fourth detecting spring portion 36 is composed of three first portions 36a and two second portions 36b, and extends in the X-axis direction while reciprocating in the Y-axis direction. The size of the second portion 36b in the Y-axis direction is greater than that of the movable detecting electrode portion 40 in the Y-axis direction.

The first detecting spring portion 30 and the second detecting spring portion 32 may be symmetrical with respect to a center C of the movable detecting electrode portion 40 in plan view. The third detecting spring portion 34 and the fourth detecting spring portion 36 may be symmetrical with respect to the center C of the movable detecting electrode portion 40 in plan view. The detecting spring portions 30, 32, 34, and 36 can be displaced in the Z-axis direction according to angular velocity about the second axis (angular velocity about the Y-axis).

Although not illustrated, the third detecting spring portion 34 and the fourth detecting spring portion 36 may not be disposed and the movable detecting electrode portion 40 may be connected to the vibrating body 20 via the first detecting spring portion 30 and the second detecting spring portion 32. Moreover, although not illustrated, the first detecting spring portion 30 and the second detecting spring portion 32 may not be disposed and the movable detecting electrode portion 40 may be connected to the vibrating body 20 via the third detecting spring portion 34 and the fourth detecting spring portion 36.

The vibrating body 20, the fixed portions 22, the driving spring portions 24, the movable driving electrode portions 26, the detecting spring portions 30, 32, 34, and 36, and the movable detecting electrode portion 40 are integrally disposed. The vibrating body 20, the fixed portions 22, the driving spring portions 24, the movable driving electrode portions 26, the detecting spring portions 30, 32, 34, and 36, and the movable detecting electrode portion 40 are integrally disposed by patterning one substrate (for example, a silicon substrate).

The material of the vibrating body 20, the fixed portion 22, the driving spring portion 24, the movable driving electrode portion 26, the detecting spring portions 30, 32, 34, and 36, and the movable detecting electrode portion 40 is, for example, silicon doped with an impurity such as phosphorus or boron to provide conductivity.

A method of bonding the fixed portion 22 and the fixed driving electrode portions 28a and 28b with the base body 10 is not particularly limited. For example, when the material of the base body 10 is glass and the material of the fixed portion 22 and the fixed driving electrode portions 28a and 28b is silicon, the base body 10 and each of the fixed portion 22 and the fixed driving electrode portions 28a and 28b can be anodically bonded together.

The fixed detecting electrode portion 50 is arranged on the base body 10. In the example shown in FIG. 2, the fixed detecting electrode portion 50 is fixed to a bottom surface (surface of the base body 10 defining the recess) 15 of the recess 14. The bottom surface 15 is a flat surface. The fixed detecting electrode portion 50 faces the movable detecting electrode portion 40 in the Z-axis direction. An upper surface (surface facing in the positive Z-axis direction) 51 of the fixed detecting electrode portion 50 is parallel to, for example, a lower surface (surface facing in a negative Z-axis direction) 41 of the movable detecting electrode portion 40. The upper surface 51 of the fixed detecting electrode portion 50, the lower surface 41 of the movable detecting electrode portion 40, and the bottom surface 15 may be parallel to an XY-plane. In the example shown in FIG. 1, the fixed detecting electrode portion 50 is arranged inside an outer edge of the movable detecting electrode portion 40 in plan view. The planar shape of the fixed detecting electrode portion 50 is, for example, an oblong.

The material of the fixed detecting electrode portion 50 is, for example, aluminum, gold, ITO (Indium Tin Oxide), or the like. The material of the fixed detecting electrode portion 50 is desirably a transparent electrode material such as ITO. This is because, with the use of a transparent electrode material as the fixed detecting electrode portion 50, when the base body 10 is a transparent substrate (glass substrate), a foreign substance or the like existing on the fixed detecting electrode portion 50 can be visually recognized easily from a lower surface 12 side of the base body 10.

The lid 60 is placed on the base body 10 (on the upper surface 11). The material of the lid 60 is, for example, silicon. A method of bonding the lid 60 with the base body 10 is not particularly limited. For example, when the material of the base body 10 is glass and the material of the lid 60 is silicon, the base body 10 and the lid 60 can be anodically bonded together. The lid 60 and the base body 10 can form a cavity 62 in which the functional element 110 is accommodated. The cavity 62 is hermetically sealed in, for example, a reduced-pressure state. With this configuration, it is possible to suppress the attenuation of a vibration phenomenon of the gyro sensor 100 (of the functional element 110) due to the viscosity of the air.

Next, operations of the gyro sensor 100 will be described. FIGS. 3 to 6 explain the operations of the gyro sensor 100 according to the embodiment. In FIGS. 3 to 6, the X-axis, the Y-axis, and the Z-axis are illustrated as three axes perpendicular to each other.

When a voltage is applied, by a power supply (not shown), to the movable driving electrode portion 26 and the fixed driving electrode portions 28a and 28b, an electrostatic force can be generated between the movable driving electrode portion 26 and each of the fixed driving electrode portions 28a and 28b. With this configuration, the driving spring portion 24 can be expanded and contracted along the X-axis (in the X-axis direction), so that the vibrating body 20 can be vibrated in the X-axis direction.

More specifically, a first alternating voltage is applied between the movable driving electrode portion 26 and the fixed driving electrode portion 28a, while a second alternating voltage whose phase is shifted by 180 degrees from the first alternating voltage is applied between the movable driving electrode portion 26 and the fixed driving electrode portion 28b. With this configuration, the vibrating body 20 can be vibrated in the X-axis direction at a predetermined frequency. In the example shown in FIG. 3, the vibrating body 20 is displaced in an $\alpha 1$ direction. In the example shown in FIG. 4, the vibrating body 20 is displaced in an $\alpha 2$ direction opposite to the $\alpha 1$ direction. With the vibration of the vibrating body 20, the movable detecting electrode portion 40 can also be vibrated in the X-axis direction.

When angular velocity $\omega$ about the Y-axis is applied to the gyro sensor 100 in a state where the vibrating body 20 vibrates in the X-axis direction, the Coriolis force acts and thus the movable detecting electrode portion 40 is displaced in the Z-axis direction. That is, the detecting spring portions 30, 32, 34, and 36 are connected to the movable detecting electrode portion 40 and the vibrating body 20 such that the movable detecting electrode portion 40 is displaceable in the Z-axis direction relative to the vibrating body 20. In the example shown in FIG. 5, the movable detecting electrode portion 40 is displaced in a $\beta 1$ direction. In the example shown in FIG. 6, the movable detecting electrode portion 40 is displaced in a $\beta 2$ direction opposite to the $\beta 1$ direction.

The movable detecting electrode portion 40 is displaced in the Z-axis direction, so that a distance between the movable detecting electrode portion 40 and the fixed detecting electrode portion 50 is changed. Therefore, an electrostatic capacitance between the movable detecting electrode portion 40 and the fixed detecting electrode portion 50 is changed. In the gyro sensor 100, a voltage is applied to the movable detecting electrode portion 40 and the fixed detecting electrode portion 50, so that the amount of change in the electrostatic capacitance between the movable detecting electrode portion 40 and the fixed detecting electrode portion 50 can be detected to obtain the angular velocity W about the Y-axis.

In the above, a form of driving the vibrating body 20 with an electrostatic force (an electrostatic driving system) has been described. However, a method of driving the vibrating body 20 is not particularly limited, and a piezoelectric driving system, an electromagnetic driving system using the Lorentz force of a magnetic field, or the like can be applied.

The gyro sensor 100 according to the embodiment has, for example, the following features.

According to the gyro sensor 100, the detecting spring portions 30 and 32 are connected to the surfaces 42a and 42b, respectively, of the vibrating body 20, where the surfaces 42a and 42b intersect (are perpendicular to) the second axis (axis parallel to the Y-axis), and have the first portions 30a and 32a, respectively, extending in a direction of the first axis (the X-axis direction). Therefore, the movable detecting electrode portion 40 can be displaced in the Z-axis direction according to angular velocity about the second axis (angular velocity about the Y-axis) while, for example, the lower surface 41 of the movable detecting electrode portion 40 keeps parallel to the upper surface 51 of the fixed detecting electrode portion 50. With this configuration, in the gyro sensor 100, a change in electrostatic capacitance between the movable detecting electrode portion 40 and the fixed detecting electrode portion 50 can be made large, compared to the case where the movable detecting electrode portion performs rotary motion, so that high detection sensitivity can be provided. Moreover, since the movable detecting electrode portion 40 and the fixed detecting electrode portion 50 keep parallel to each other, it is possible, for example, to suppress an influence of driving vibration (vibration in the X-axis direction due to the driving portion 27) or the possession of sensitivity in regard to another axis (the first axis or the third axis). For example, when the detecting spring portion does not have the portion extending in the X-axis direction, the entire length of the detecting spring portion becomes short and thus the movable detecting electrode portion sometimes cannot be displaced in the Z-axis direction.

Further, in the gyro sensor 100, the first detecting spring portion 30 is connected to the first side surface 42a of the vibrating body 20, while the second detecting spring portion 32 is connected to the second side surface 42b of the vibrating body 20. Therefore, in the gyro sensor 100, it is possible to suppress the displacement of the movable detecting electrode portion 40 in the X-axis direction relative to the vibrating body 20. With this configuration, it is possible to suppress a change in the area of the movable detecting electrode portion 40 overlapping with the fixed detecting electrode portion 50 in plan view, so that the gyro sensor 100 can have high detection sensitivity.

According to the gyro sensor 100, the third detecting spring portion 34 is connected to the third side surface 42c of the vibrating body 20, while the fourth detecting spring portion 36 is connected to the fourth side surface 42*d* of the vibrating body 20. Therefore, in the gyro sensor 100, it is possible to suppress the displacement of the movable detecting electrode portion 40 in the Y-axis direction relative to the vibrating body 20. With this configuration, it is possible to suppress a change in the area of the movable detecting electrode portion 40 overlapping with the fixed detecting electrode portion 50 in plan view, so that the gyro sensor 100 can have high detection sensitivity.

According to the gyro sensor 100, the detecting spring portions 30, 32, 34, and 36 are connected to the corner portions 44*a*, 44*b*, 44*c*, and 44*d*, respectively. Therefore, the movable detecting electrode portion 40 can be displaced more stably in the Z-axis direction according to angular velocity about the second axis (angular velocity about the Y-axis) while the lower surface 41 of the movable detecting electrode portion 40 keeps parallel to the upper surface 51 of the fixed detecting electrode portion 50.

2. Method of Manufacturing Gyro Sensor

Next, a method of manufacturing the gyro sensor according to the embodiment will be described with reference to the drawings. FIGS. 7 to 9 are cross-sectional views schematically showing manufacturing steps of the gyro sensor 100 according to the embodiment.

As shown in FIG. 7, a glass substrate, for example, is etched to form the recess 14 in the glass substrate, so that the base body 10 is obtained. The etching is performed by, for example, wet etching. Through the step, the base body 10 in which the recess 14 is disposed can be prepared.

Next, the fixed detecting electrode portion 50 is formed on the bottom surface 15 of the recess 14. The fixed detecting electrode portion 50 is formed by depositing a conductive layer on the bottom surface 15 by a sputtering method or the like and then patterning the conductive layer using a photolithographic technique and an etching technique.

As shown in FIG. 8, a silicon substrate 2, for example, is bonded on the upper surface 11 of the base body 10. The bonding of the base body 10 with the silicon substrate 2 is performed by, for example, anodic bonding.

As shown in FIG. 9, the silicon substrate 2 is grinded by, for example, a grinding machine to be a thin film, and then patterned (processed) into a desired shape to form the vibrating body 20, the fixed portions 22, the driving spring portions 24, the driving portions 27, the detecting spring portions 30, 32, 34, and 36, and the movable detecting electrode portion 40. The patterning is performed by a photolithographic technique and an etching technique (dry etching). As a more specific etching technique, the Bosch process can be used. In the step, by patterning (etching) the silicon substrate 2, the vibrating body 20, the fixed portions 22, the driving spring portions 24, the movable driving electrode portion 26, the detecting spring portions 30, 32, 34, and 36, and the movable detecting electrode portion 40 are integrally formed.

As shown in FIG. 2, the lid 60 is bonded to the base body 10 to accommodate the functional element 110 in the cavity 62 formed by the base body 10 and the lid 60. The bonding of the base body 10 with the lid 60 is performed by, for example, anodic bonding or using adhesive or the like.

Through the steps described above, the gyro sensor 100 according to the embodiment can be manufactured.

According to the method of manufacturing the gyro sensor 100, the gyro sensor 100 that can have high detection sensitivity can be obtained.

3. Modified Examples of Gyro Sensor 3. 1. First Modified Example

Figure 10:
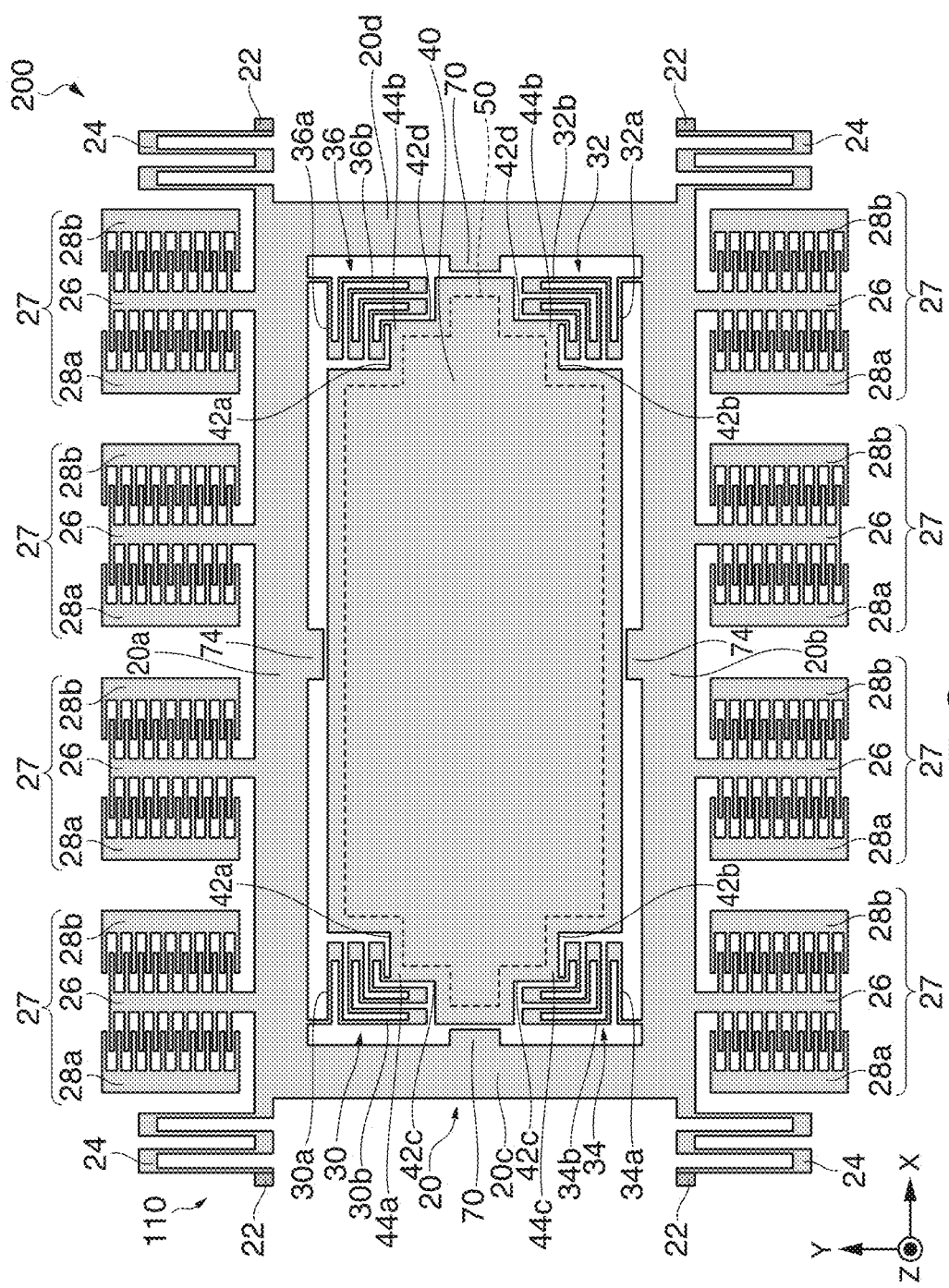
FIG. 10 is a plan view schematically showing a gyro sensor according to a first modified example of the embodiment.

Next, a gyro sensor according to a first modified example of the embodiment will be described with reference to the drawing. FIG. 10 is a plan view schematically showing the gyro sensor 200 according to the first modified example of the embodiment. For convenience sake, the illustration of the base body 10 and the lid 60 is omitted in FIG. 10. Moreover, in FIG. 10, the X-axis, the Y-axis, and the Z-axis are illustrated as three axes perpendicular to each other. Hereinafter, in the gyro sensor 200, members having functions similar to those of the constituent members of the gyro sensor 100 described above are denoted by the same reference signs and numerals, and the detailed description thereof is omitted.

In the gyro sensor 100 as shown in FIG. 1, the first detecting spring portion 30 and the second detecting spring portion 32 extend in the Y-axis direction while reciprocating in the X-axis direction. Moreover, the third detecting spring portion 34 and the fourth detecting spring portion 36 extend in the X-axis direction while reciprocating in the Y-axis direction.

In contrast to this, in the gyro sensor 200 as shown in FIG. 10, the first detecting spring portion 30 extends from the first extending portion 20*a* of the vibrating body 20 to the first corner portion 44*a* of the movable detecting electrode portion 40 while reciprocating in the X-axis direction and the Y-axis direction. The first detecting spring portion 30 is disposed along the first corner portion 44*a* in plan view. The first detecting spring portion 30 is composed of a plurality of first portions 30*a* (portions extending in the X-axis direction) and a plurality of second portions 30*b* (portions extending in the Y-axis direction). The size of the first portion 30*a* in the X-axis direction is smaller than that of the movable detecting electrode portion 40 in the X-axis direction. The size of the second portion 30*b* in the Y-axis direction is smaller than that of the movable detecting electrode portion 40 in the Y-axis direction.

The second detecting spring portion 32 extends from the second extending portion 20*b* of the vibrating body 20 to the second corner portion 44*b* of the movable detecting electrode portion 40 while reciprocating in the X-axis direction and the Y-axis direction. The second detecting spring portion 32 is disposed along the second corner portion 44*b* in plan view. The second detecting spring portion 32 is composed of a plurality of first portions 32*a* and a plurality of second portions 32*b*. The size of the first portion 32*a* in the X-axis direction is smaller than that of the movable detecting electrode portion 40 in the X-axis direction. The size of the second portion 32*b* in the Y-axis direction is smaller than that of the movable detecting electrode portion 40 in the Y-axis direction.

The third detecting spring portion 34 extends from the second extending portion 20*b* of the vibrating body 20 to the third corner portion 44*c* of the movable detecting electrode portion 40 while reciprocating in the X-axis direction and the Y-axis direction. In the illustrated example, the third detecting spring portion 34 is connected to the second side surface 42*b* of the movable detecting electrode portion 40. The third detecting spring portion 34 is disposed along the third corner portion 44*c* in plan view. The third detecting spring portion 34 is composed of a plurality of first portions 34*a* and a plurality of second portions 34*b*. The size of the first portion 34*a* in the X-axis direction is smaller than that of the movable detecting electrode portion 40 in the X-axis direction. The size of the second portion 34*b* in the Y-axis direction is smaller than that of the movable detecting electrode portion 40 in the Y-axis direction. Although not illustrated, the third detecting spring portion 34 may be connected to the third extending portion 20c of the vibrating body 20 and the third side surface 42c of the movable detecting electrode portion 40.

The fourth detecting spring portion 36 extends from the first extending portion 20a of the vibrating body 20 to the fourth corner portion 44d of the movable detecting electrode portion 40 while reciprocating in the X-axis direction and the Y-axis direction. In the illustrated example, the fourth detecting spring portion 36 is connected to the first side surface 42a of the movable detecting electrode portion 40. The fourth detecting spring portion 36 is disposed along the fourth corner portion 44d in plan view. The fourth detecting spring portion 36 is composed of a plurality of first portions 36a and a plurality of second portions 36b. The size of the first portion 36a in the X-axis direction is smaller than that of the movable detecting electrode portion 40 in the X-axis direction. The size of the second portion 36b in the Y-axis direction is smaller than that of the movable detecting electrode portion 40 in the Y-axis direction. Although not illustrated, the fourth detecting spring portion 36 may be connected to the fourth extending portion 20d of the vibrating body 20 and the fourth side surface 42d of the movable detecting electrode portion 40.

The gyro sensor 200 can have first stopper portions 70 arranged between the vibrating body 20 and the movable detecting electrode portion 40 in the X-axis direction. In the illustrated example, the first stopper portion 70 is disposed in the third extending portion 20c and the fourth extending portion 20d of the vibrating body 20, and faces the movable detecting electrode portion 40. The first stopper portions 70 are disposed integrally with, for example, the vibrating body 20. Although not illustrated, the first stopper portions 70 may be disposed in the movable detecting electrode portion 40 and face the third extending portion 20c and the fourth extending portion 20d of the vibrating body 20.

The gyro sensor 200 can have third stopper portions 74 arranged between the vibrating body 20 and the movable detecting electrode portion 40 in the Y-axis direction. In the illustrated example, the third stopper portion 74 is disposed in the first extending portion 20a and the second extending portion 20b of the vibrating body 20, and faces the movable detecting electrode portion 40. The third stopper portions 74 are disposed integrally with, for example, the vibrating body 20. Although not illustrated, the third stopper portions 74 may be disposed in the movable detecting electrode portion 40 and face the first extending portion 20a and the second extending portion 20b of the vibrating body 20.

According to the gyro sensor 200, the detecting spring portions 30, 32, 34, and 36 are disposed along the corner portions 44a, 44b, 44c, and 44d, respectively, of the movable detecting electrode portion 40. Therefore, in the gyro sensor 200, the areas of the movable detecting electrode portion 40 and the fixed detecting electrode portion 50 can be increased while maintaining the entire length of the detecting spring portions 30, 32, 34, and 36, compared to the gyro sensor 100. As a result, the gyro sensor 200 can have high detection sensitivity.

According to the gyro sensor 200, the first stopper portions 70 arranged between the vibrating body 20 and the movable detecting electrode portion 40 in the X-axis direction are included. Therefore, in the gyro sensor 200, it is possible to suppress the displacement of the movable detecting electrode portion 40 in the X-axis direction relative to the vibrating body 20. With this configuration, it is possible to suppress a change in the area of the movable detecting electrode portion 40 overlapping with the fixed detecting electrode portion 50 in plan view, so that the gyro sensor 200 can have high detection sensitivity. Moreover, for example, it is possible to suppress the breakage of the movable detecting electrode portion 40 caused by a collision with the vibrating body 20.

According to the gyro sensor 200, the third stopper portions 74 arranged between the vibrating body 20 and the movable detecting electrode portion 40 in the Y-axis direction are included. Therefore, in the gyro sensor 200, it is possible to suppress the displacement of the movable detecting electrode portion 40 in the Y-axis direction relative to the vibrating body 20. With this configuration, it is possible to suppress a change in the area of the movable detecting electrode portion 40 overlapping with the fixed detecting electrode portion 50 in plan view, so that the gyro sensor 200 can have high detection sensitivity. Moreover, for example, it is possible to suppress the breakage of the movable detecting electrode portion 40 caused by a collision with the vibrating body 20.

3. 2. Second Modified Example

Figure 11:
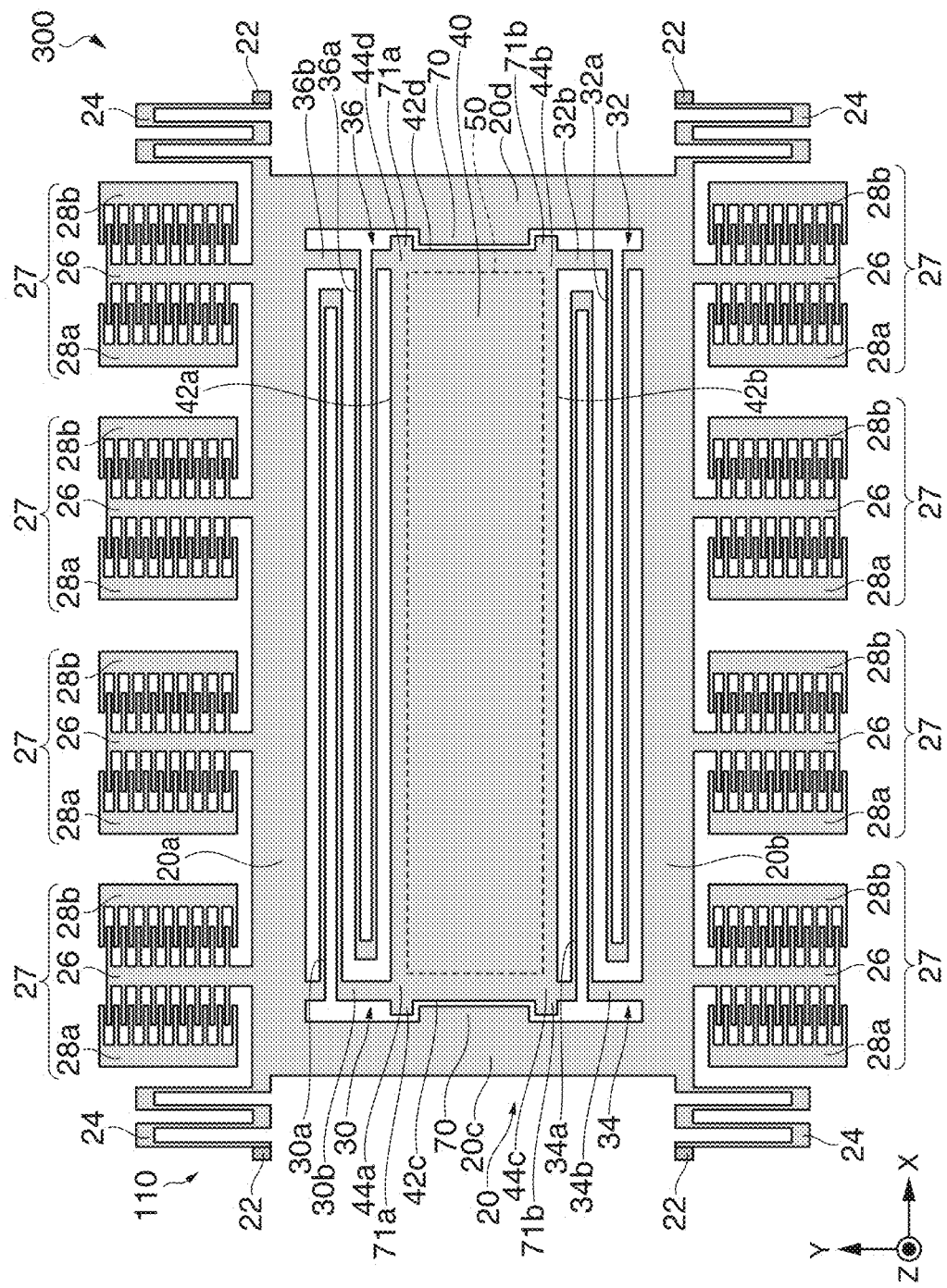
FIG. 11 is a plan view schematically showing a gyro sensor according to a second modified example of the embodiment.

Next, a gyro sensor according to a second modified example of the embodiment will be described with reference to the drawing. FIG. 11 is a plan view schematically showing the gyro sensor 300 according to the second modified example of the embodiment. For convenience sake, the illustration of the base body 10 and the lid 60 is omitted in FIG. 11. Moreover, in FIG. 11, the X-axis, the Y-axis, and the Z-axis are illustrated as three axes perpendicular to each other. Hereinafter, in the gyro sensor 300, members having functions similar to those of the constituent members of the gyro sensors 100 and 200 described above are denoted by the same reference signs and numerals, and the detailed description thereof is omitted.

In the gyro sensor 100 as shown in FIG. 1, the third detecting spring portion 34 extends in the X-axis direction from the third extending portion 20c of the vibrating body 20 to the third side surface 42c of the movable detecting electrode portion 40 while reciprocating in the Y-axis direction. Moreover, the fourth detecting spring portion 36 extends in the X-axis direction from the fourth extending portion 20d of the vibrating body 20 to the fourth side surface 42d of the movable detecting electrode portion 40 while reciprocating in the Y-axis direction.

In contrast to this, in the gyro sensor 300 as shown in FIG. 11, the third detecting spring portion 34 extends in the Y-axis direction from the second extending portion 20b of the vibrating body 20 to the second side surface 42b of the movable detecting electrode portion 40 while reciprocating in the X-axis direction. In the illustrated example, the third detecting spring portion 34 is connected to the third corner portion 44c of the movable detecting electrode portion 40. More specifically, the third detecting spring portion 34 is connected to an end of the second side surface 42b on the third side surface 42c side. The first portions 34a of the third detecting spring portion 34 are disposed along the second side surface 42b.

The fourth detecting spring portion 36 extends in the Y-axis direction from the first extending portion 20a of the vibrating body 20 to the first side surface 42a of the movable detecting electrode portion 40 while reciprocating in the X-axis direction. In the illustrated example, the fourth detecting spring portion 36 is connected to the fourth corner portion 44d of the movable detecting electrode portion 40. More specifically, the fourth detecting spring portion 36 is connected to an end of the first side surface 42a on the fourth side surface 42d side. The first portions 36a of the fourth detecting spring portion 36 are disposed along the first side surface 42a.

The planar shape of the movable detecting electrode portion 40 is, for example, an oblong having long sides along the X-axis. The size of the movable detecting electrode portion 40 in the X-axis direction is greater than that of the movable detecting electrode portion 40 in the Y-axis direction.

The gyro sensor 300 can have first stopper portions 71a and 71b arranged between the vibrating body 20 and the movable detecting electrode portion 40 in the X-axis direction. The stopper portions 71a and 71b are disposed on each of the third side surface 42c and the fourth side surface 42d of the movable detecting electrode portion 40, and face the vibrating body 20. The stopper portions 71a and 71b are disposed integrally with, for example, the movable detecting electrode portion 40. The stopper portion 71a is disposed on the positive Y-axis direction side of the stopper portion 70. The stopper portion 71a has a portion facing the stopper portion 70 in the Y-axis direction. The stopper portion 71b is disposed on the negative Y-axis direction side of the stopper portion 70. The stopper portion 71b has a portion facing the stopper portion 70 in the Y-axis direction.

According to the gyro sensor 300, the third detecting spring portion 34 is connected to the first side surface 42a of the vibrating body 20, while the fourth detecting spring portion 36 is connected to the second side surface 42b of the vibrating body 20. Further, the size of the movable detecting electrode portion 40 in the X-axis direction is greater than that of the movable detecting electrode portion 40 in the Y-axis direction. Therefore, in the gyro sensor 300, the first portions 34a of the third detecting spring portion 34 and the first portions 36a of the fourth detecting spring portion 36 can be arranged along the first side surface 42a and the second side surface 42b along the X-axis in plan view. With this configuration, in the gyro sensor 300, the entire length of the third detecting spring portion 34 and the fourth detecting spring portion 36 can be increased compared to the gyro sensor 100. Hence, the movable detecting electrode portion 40 of the gyro sensor 300 is more likely to be displaced in the Z-axis direction according to angular velocity about the second axis, compared to the movable detecting electrode portion 40 of the gyro sensor 100, so that high detection sensitivity can be provided.

According to the gyro sensor 300 as described above, the first stopper portions 70, 71a, and 71b arranged between the vibrating body 20 and the movable detecting electrode portion 40 in the X-axis direction are included. Therefore, in the gyro sensor 300, it is possible to suppress the displacement of the movable detecting electrode portion 40 in the X-axis direction and the Y-axis direction relative to the vibrating body 20. With this configuration, it is possible to suppress a change in the area of the movable detecting electrode portion 40 overlapping with the fixed detecting electrode portion 50 in plan view, so that the gyro sensor 300 can have high detection sensitivity. Moreover, for example, it is possible to suppress the breakage of the movable detecting electrode portion 40 caused by a collision with the vibrating body 20.

3. 3. Third Modified Example

Figure 12:
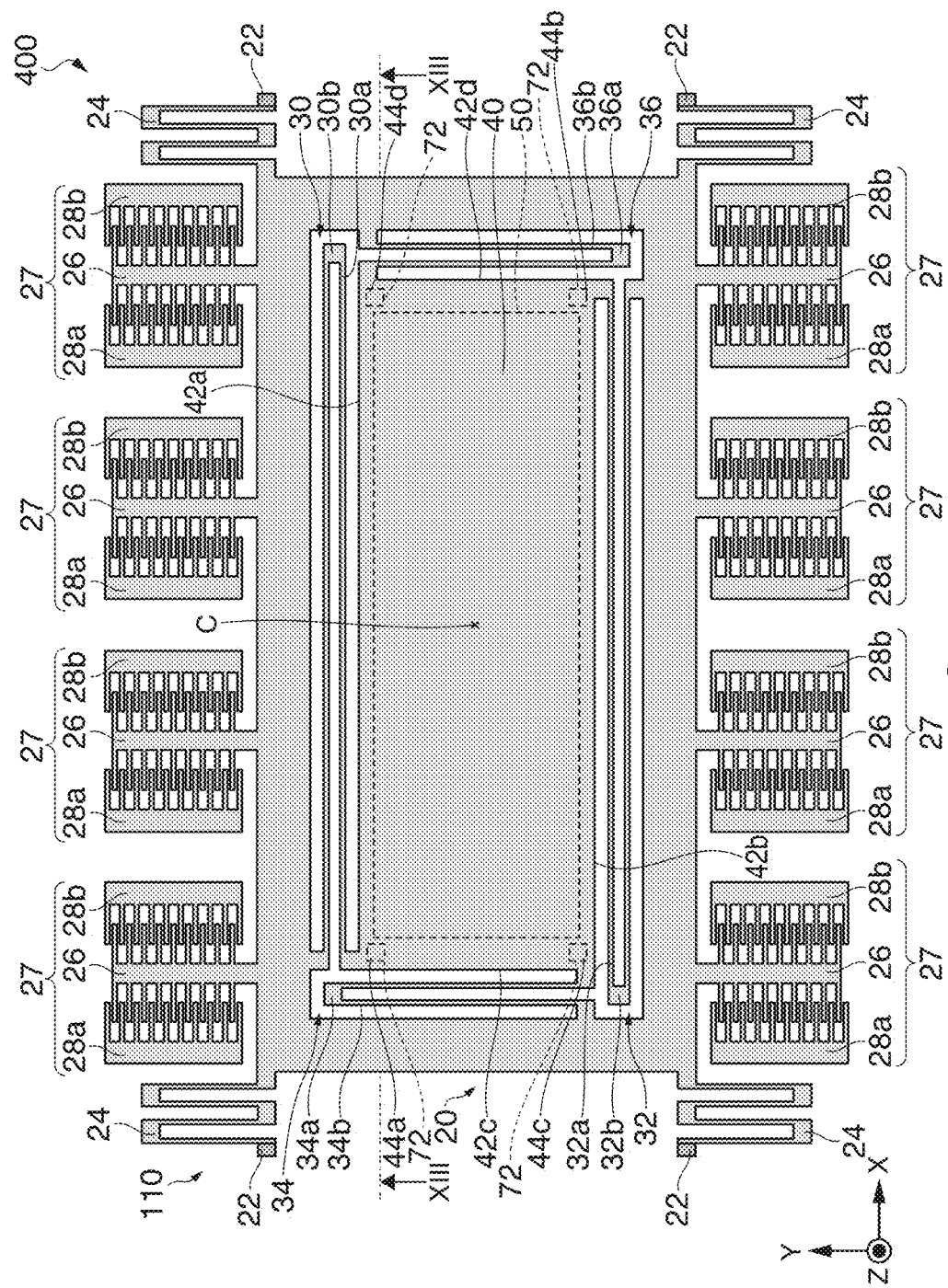
FIG. 12 is a plan view schematically showing a gyro sensor according to a third modified example of the embodiment.
Figure 13:
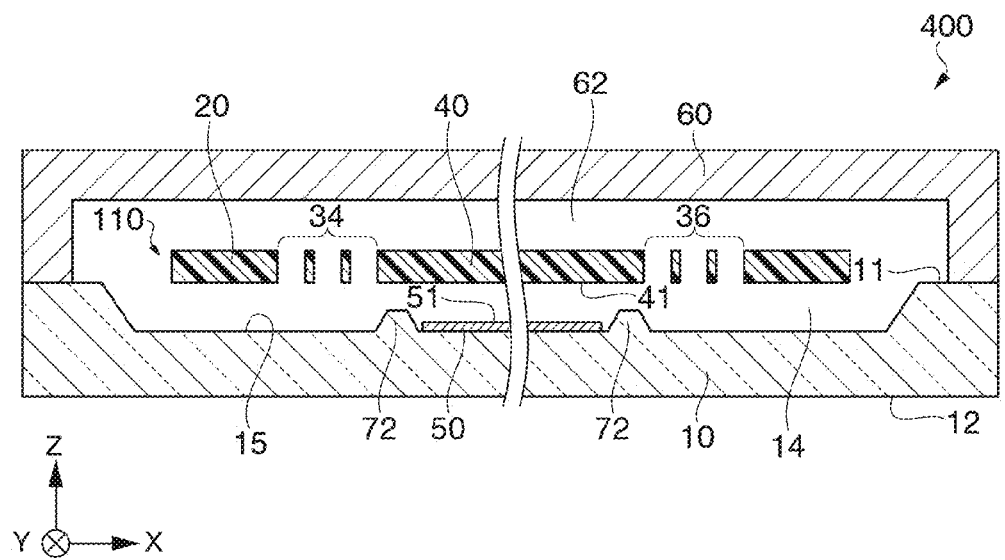
FIG. 13 is a cross-sectional view schematically showing the gyro sensor according to the third modified example of the embodiment.

Next, a gyro sensor according to a third modified example of the embodiment will be described with reference to the drawings. FIG. 12 is a plan view schematically showing the gyro sensor 400 according to the third modified example of the embodiment. FIG. 13 is a cross-sectional view schematically showing the gyro sensor 400 according to the third modified example of the embodiment, taken along line XIII-XIII of FIG. 12. For convenience sake, the illustration of the base body 10 and the lid 60 is omitted in FIG. 12. Moreover, in FIG. 12, the X-axis, the Y-axis, and the Z-axis are illustrated as three axes perpendicular to each other. Hereinafter, in the gyro sensor 400, members having functions similar to those of the constituent members of the gyro sensor 100 described above are denoted by the same reference signs and numerals, and the detailed description thereof is omitted.

As shown in FIGS. 12 and 13, the gyro sensor 400 is different from the gyro sensor 100 in that the gyro sensor 400 has second stopper portions 72.

The second stopper portions 72 are arranged between the base body 10 and the movable detecting electrode portion 40 in the Z-axis direction. As shown in FIG. 12, the second stopper portions 72 are arranged to overlap with the movable detecting electrode portion 40 in plan view. In the example shown in FIG. 13, the second stopper portions 72 are disposed on the bottom surface 15 of the recess 14 and protrude upwardly (on the positive Z-axis direction side) from the surface of the base body 10. The second stopper portions 72 are disposed integrally with, for example, the base body 10. In the example shown in FIG. 12, four second stopper portions 72 are disposed. Each of the second stopper portions 72 is arranged at a position overlapping with the first corner portion 44a, a position overlapping with the second corner portion 44b, a position overlapping with the third corner portion 44c, and a position overlapping with the fourth corner portion 44d. The second stopper portions 72 are arranged so as to avoid the fixed detecting electrode portion 50.

Although not illustrated, the second stopper portion 72 may be disposed not on the surface of the base body 10 but on the lower surface 41 of the movable detecting electrode portion 40. Moreover, the number of the second stopper portions 72 is not particularly limited, and one second stopper portion 72 may be disposed at a position overlapping with the center C of the movable detecting electrode portion 40.

According to the gyro sensor 400, the second stopper portions 72 arranged between the base body 10 and the movable detecting electrode portion 40 in the Z-axis direction are included. In a gyro sensor, for example, a potential difference is always given between a fixed detecting electrode portion and a movable detecting electrode portion for producing an angular velocity detection signal. As a result, an electrostatic attraction acts, and usually, the fixed detecting electrode portion and the movable detecting electrode portion are balanced due to the resilience of a spring portion. When subjected to a strong impact, the movable detecting electrode portion moves in a vertical direction (the Z-axis direction) of a base body, so that the movable detecting electrode portion sometimes adheres to the fixed detecting electrode portion by an electrostatic attraction. The second stopper portion 72 can prevent the adhesion of the movable detecting electrode portion 40. Further, the second stopper portion 72 can prevent, in forming of the movable detecting electrode portion 40 by dry etching a silicon substrate for example, the adhesion of the movable detecting electrode portion 40 at the end of etching because the base body 10 or the fixed detecting electrode portion 50 is charged with etching ions.

4. Electronic Apparatuses

Next, electronic apparatuses according to the embodiment will be described with reference to the drawings. The electronic apparatuses according to the embodiment include the gyro sensor according to the embodiment of the invention. In the following, electronic apparatuses including the gyro sensor 100 as the gyro sensor according to the embodiment of the invention will be described.

Figure 14:
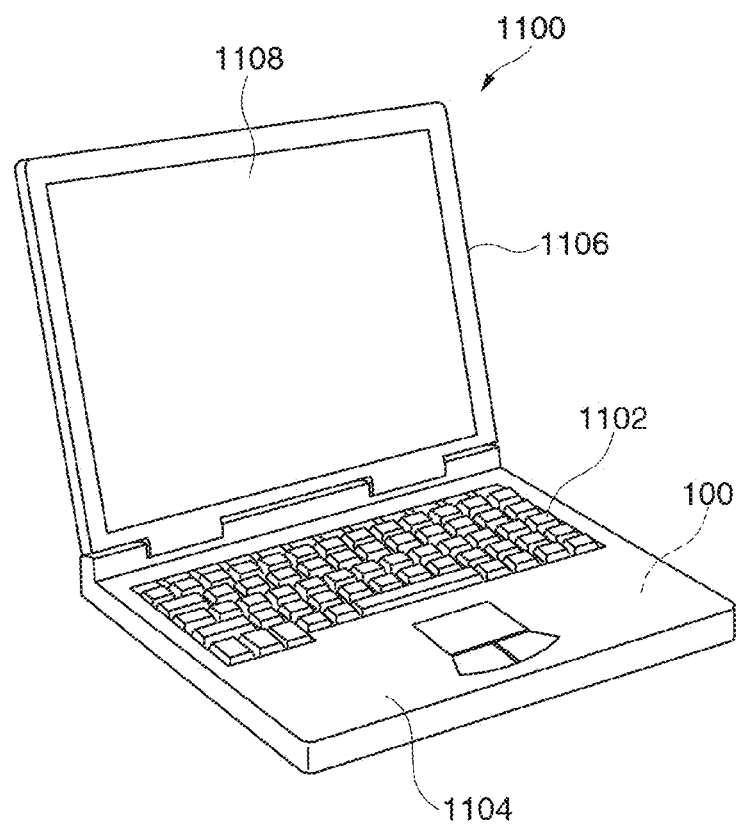
FIG. 14 is a perspective view schematically showing an electronic apparatus according to the embodiment.

FIG. 14 is a perspective view schematically showing a mobile (or notebook) personal computer 1100 as an electronic apparatus according to the embodiment.

As shown in FIG. 14, the personal computer 1100 includes a main body portion 1104 including a keyboard 1102 and a display unit 1106 having a display portion 1108. The display unit 1106 is rotationally movably supported relative to the main body portion 1104 via a hinge structure portion.

In the personal computer 1100, the gyro sensor 100 is incorporated.

Figure 15:
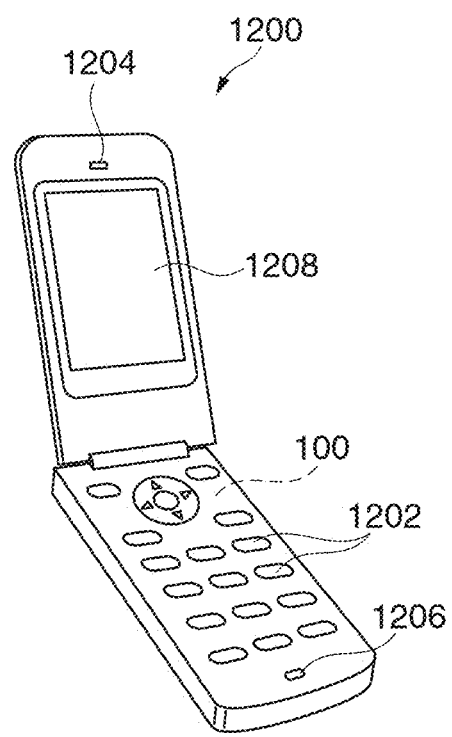
FIG. 15 is a perspective view schematically showing an electronic apparatus according to the embodiment.

FIG. 15 is a perspective view schematically showing a mobile phone (including a PHS) 1200 as an electronic apparatus according to the embodiment.

As shown in FIG. 15, the mobile phone 1200 includes a plurality of operation buttons 1202, an earpiece 1204, and a mouthpiece 1206. A display portion 1208 is arranged between the operation buttons 1202 and the earpiece 1204.

In the mobile phone 1200, the gyro sensor 100 is incorporated.

Figure 16:
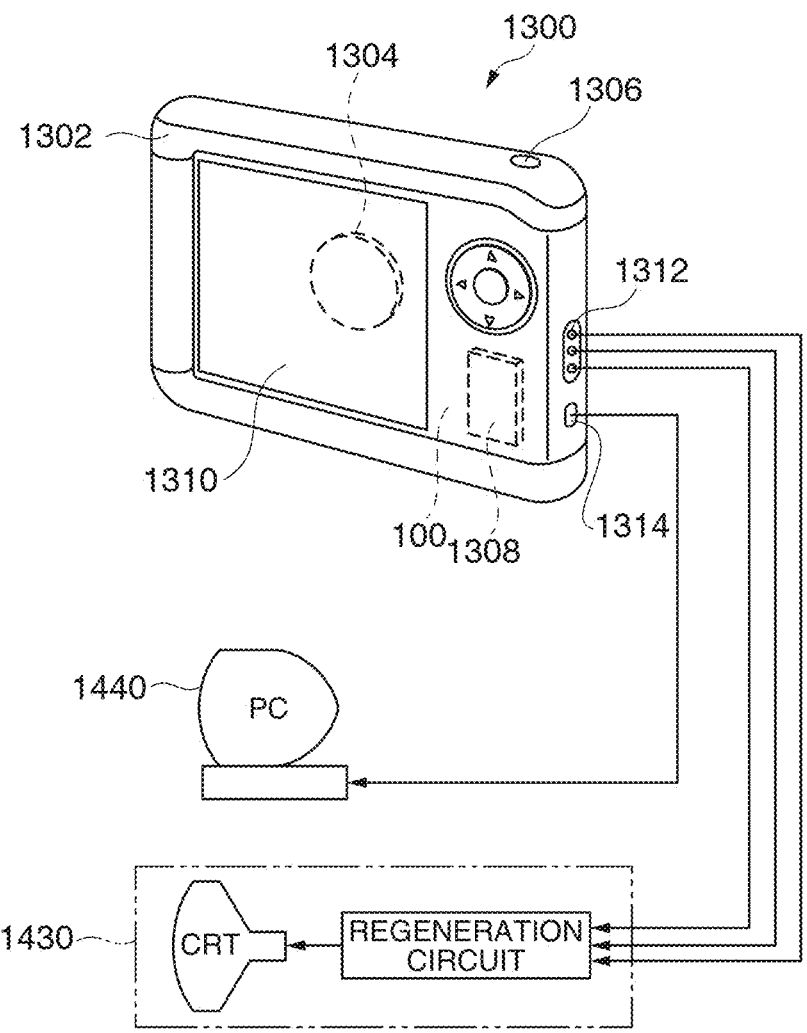
FIG. 16 is a perspective view schematically showing an electronic apparatus according to the embodiment.

FIG. 16 is a perspective view schematically showing a digital still camera 1300 as an electronic apparatus according to the embodiment. In FIG. 16, connections with external apparatuses are also shown in a simplified manner.

Here, usual cameras expose a silver halide photographic film with an optical image of a subject, whereas the digital still camera 1300 photoelectrically converts an optical image of a subject with an imaging element such as a CCD (Charge Coupled Device) to generate imaging signals (image signals).

A display portion 1310 is disposed on the back surface of a case (body) 1302 in the digital still camera 1300 and configured to perform display based on imaging signals generated by a CCD. The display portion 1310 functions as a finder that displays a subject as an electronic image.

Moreover, on the front side (the rear side in the drawing) of the case 1302, a light receiving unit 1304 including an optical lens (imaging optical system) and a CCD is disposed.

When a photographer confirms a subject image displayed on the display portion 1310 and presses down a shutter button 1306, imaging signals of a CCD at the time are transferred to and stored in a memory 1308.

Moreover, in the digital still camera 1300, a video signal output terminal 1312 and a data communication input/output terminal 1314 are disposed on the side surface of the case 1302. Then, a television monitor 1430 and a personal computer 1440 are connected as necessary to the video signal output terminal 1312 and the data communication input/output terminal 1314, respectively. Further, the imaging signals stored in the memory 1308 are output to the television monitor 1430 or the personal computer 1440 by a predetermined operation.

In the digital still camera 1300, the gyro sensor 100 is incorporated.

Since the electronic apparatuses 1100, 1200, and 1300 described above include the gyro sensor 100, high detection sensitivity can be provided.

An electronic apparatus including the gyro sensor 100 can be applied to for example, in addition to the personal computer (mobile personal computer) shown in FIG. 14, the mobile phone shown in FIG. 15, and the digital still camera shown in FIG. 16, inkjet ejection apparatuses (for example, inkjet printers), laptop personal computers, television sets, video camcorders, video tape recorders, various kinds of navigation systems, pagers, electronic notebooks (including those with communication function), electronic dictionaries, calculators, electronic gaming machines, head-mounted displays, word processors, workstations, videophones, surveillance television monitors, electronic binoculars, POS terminals, medical equipment (for example, electronic thermometers, sphygmomanometers, blood glucose meters, electrocardiogram measuring systems, ultrasonic diagnosis apparatuses, and electronic endoscopes), fishfinders, various kinds of measuring instrument, indicators (for example, indicators used in vehicles, aircraft, rockets, and ships), the attitude control of robots or the human body, flight simulators, and the like.

The embodiment and modified examples described above are illustrative only, and the invention is not limited to them. For example, the embodiment and each of the modified examples can be combined appropriately.

The invention includes a configuration (for example, a configuration having the same function, method, and result, or a configuration having the same advantage and advantageous effect) that is substantially the same as those described in the embodiment. Moreover, the invention includes a configuration in which a non-essential portion of the configurations described in the embodiment is replaced. Moreover, the invention includes a configuration that provides the same operational effects as those of the configurations described in the embodiment, or a configuration that can achieve the same advantages. Moreover, the invention includes a configuration in which a publicly known technique is added to the configurations described in the embodiment.

The entire disclosure of Japanese Patent Application No: 2012-095481, filed Apr. 19, 2012 is expressly incorporated by reference herein.

What is claimed is:
1. A gyro sensor comprising:
a base body;
a vibrating body;
a driving portion driving the vibrating body in a direction of a first axis;
a movable electrode portion displaceable, according to angular velocity about a second axis perpendicular to the first axis, in a direction of a third axis perpendicular to the first axis and the second axis;
a plurality of spring portions connected to the vibrating body, the plurality of spring portions consisting of a first spring portion, a second spring portion, a third spring portion, and a fourth spring portion;
the first spring portion connected to a first surface of the movable electrode portion, the first surface intersecting the second axis;
the second spring portion connected to a second surface of the movable electrode portion, the second surface being parallel to the first surface; and
a fixed electrode portion arranged on the base body and facing the movable electrode portion in the direction of the third axis,
wherein each of the first spring portion, the second spring portion, the third spring portion, and the fourth spring portion have a portion extending in the direction of the first axis and a portion extending in a direction of the second axis,
a length of each of the first spring portion and the second spring portion is substantially equal to a length of the movable electrode portion in the direction of the first axis, or longer than the length of the movable electrode portion in the direction of the first axis, and the vibrating body peripherally frames the movable electrode portion, and includes a first and second extending portions that extend parallel with the first axis, and third and fourth extending portions that extend parallel with the second axis, wherein the first, second, third, and fourth extending portions are unitary.

2. The gyro sensor according to claim 1, wherein the third spring portion is connected to a third surface of the movable electrode portion, the third surface intersecting the first axis; and the fourth spring portion is connected to a fourth surface of the movable electrode portion, the fourth surface being parallel to the third surface.

3. The gyro sensor according to claim 1, wherein the first spring portion is connected to a first corner portion formed by the first surface and the third surface, the second spring portion is connected to a second corner portion formed by the second surface and the fourth surface, the third spring portion is connected to a third corner portion formed by the second surface and the third surface, and the fourth spring portion is connected to a fourth corner portion formed by the first surface and the fourth surface.

4. The gyro sensor according to claim 1, wherein the first surface intersects the second axis, the first spring portion is connected to a first corner portion formed by the first surface and a third surface of the movable electrode portion, the third surface intersecting the first axis, the second spring portion is connected to a second corner portion formed by the second surface and a fourth surface of the movable electrode portion, the fourth surface being parallel to the third surface, the first spring portion is disposed along the first corner portion as viewed from the direction of the third axis, and the second spring portion is disposed along the second corner portion as viewed from the direction of the third axis.

5. The gyro sensor according to claim 1, wherein the third spring portion is connected to the second surface; and the fourth spring portion is connected to the first surface, and the size of the movable electrode portion in the direction of the first axis is greater than that of the movable electrode portion in the direction of the second axis.

6. The gyro sensor according to claim 4, further comprising a first stopper portion arranged between the vibrating body and the movable electrode portion in the direction of the first axis.

7. The gyro sensor according to claim 5, further comprising a first stopper portion arranged between the vibrating body and the movable electrode portion in the direction of the first axis.

8. The gyro sensor according to claim 1, further comprising a second stopper portion arranged between the base body and the movable electrode portion in the direction of the third axis.

9. A mobile phone comprising the gyro sensor according to claim 1.

10. An mobile phone comprising the gyro sensor according to claim 2.

11. An mobile phone comprising the gyro sensor according to claim 3.

12. A mobile phone comprising the gyro sensor according to claim 4.

13. An mobile phone comprising the gyro sensor according to claim 5.

14. A mobile phone comprising the gyro sensor according to claim 6.

15. A mobile phone comprising the gyro sensor according to claim 7.

16. A mobile phone comprising the gyro sensor according to claim 8.

* * * * *